United States Patent
Ding

(10) Patent No.: US 8,378,963 B2
(45) Date of Patent: Feb. 19, 2013

(54) PHOTOSENSORS FOR DISPLAYS AND RELATED DEVICES

(75) Inventor: Hong Ding, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 2570 days.

(21) Appl. No.: 11/008,400

(22) Filed: Dec. 9, 2004

(65) Prior Publication Data

US 2006/0125769 A1    Jun. 15, 2006

(51) Int. Cl.
*G09G 3/36*    (2006.01)
*G09G 5/00*    (2006.01)

(52) U.S. Cl. .......................... 345/104; 345/207

(58) Field of Classification Search .................. 345/204, 345/207, 690, 87–102, 104; 349/1, 56
See application file for complete search history.

(56) References Cited

U.S. PATENT DOCUMENTS

| | | | |
|---|---|---|---|
| 5,384,577 A | 1/1995 | McLaughlin et al. | |
| 5,831,693 A | 11/1998 | McCartney et al. | |
| 6,115,091 A * | 9/2000 | Kondoh et al. | 349/72 |
| 6,399,933 B2 * | 6/2002 | Zhang et al. | 250/208.1 |
| 6,870,529 B1 * | 3/2005 | Davis | 345/207 |
| 7,068,254 B2 * | 6/2006 | Yamazaki et al. | 345/104 |
| 2001/0020922 A1 * | 9/2001 | Yamazaki et al. | 345/45 |
| 2002/0011978 A1 * | 1/2002 | Yamazaki et al. | 345/87 |
| 2003/0137485 A1 * | 7/2003 | Wei et al. | 345/102 |

* cited by examiner

*Primary Examiner* — Stephen Sherman
(74) *Attorney, Agent, or Firm* — Myers Bigel Sibley & Sajovec, P.A.

(57) ABSTRACT

An electronic device may include a liquid crystal display, a photosensor, a light, and a controller. The liquid crystal display may have first and second transparent substrates and a liquid crystal material between the first and second transparent substrates. The photosensor may be on a portion of the first transparent substrate so that the first transparent substrate is between the photosensor and the second transparent substrate, and the light may be configured to provide illumination for the electronic device. The controller may be coupled to the photosensor and the light, and the controller may be configured to vary an intensity of the illumination from the light responsive to an intensity of light incident of the photosensor. Related displays are also discussed.

22 Claims, 2 Drawing Sheets

PHOTOSENSORS FOR DISPLAYS AND RELATED DEVICES

FIELD OF THE INVENTION

The present invention relates to the field of electronics, and more particularly to electronic displays and related devices.

BACKGROUND

In many electronic devices such as personal digital assistants (PDAs), radiotelephones, handheld computers, and/or laptop/notebook computers, a liquid crystal display is used as an output user interface to provide information visually. A Thin Film Transistor Liquid Crystal Display (TFT LCD), for example, has a sandwich-like structure with liquid crystal between two glass substrates. A first TFT glass substrate includes thereon a thin film transistor for each pixel of the display, and a second color filter glass substrate includes a color filter to generate color. A liquid crystal material between the two glass substrates moves in accordance with differences in voltage between the color filter glass substrate and the TFT glass substrate. A backlight transmits illumination through the liquid crystal display, and an attenuation of illumination transmitted through each pixel of the display is determined by an amount of movement of the liquid crystal material at that pixel, and a size of a transmissive area of a pixel.

Light sensors for displays are discussed, for example, in U.S. Pat. No. 5,831,693 (the '693 patent), and in U.S. Pat. No. 5,384,577 (the '577 patent), the disclosures of which are hereby incorporated herein in their entirety by reference. The '693 patent discusses self adjusting a display luminance of an active matrix liquid crystal display panel according to ambient lighting. More particularly, at least one photodiode is fabricated on a lower glass substrate using effectively the same process steps as those used to fabricate the display panel. The '577 patent discusses a combination display backlight and light sensor.

SUMMARY

According to embodiments of the present invention, an electronic device may include a liquid crystal display, a photosensor, a light, and a controller. The liquid crystal display may have first and second transparent substrates and a liquid crystal material between the first and second transparent substrates. The photosensor may be on a portion of the first transparent substrate so that the first transparent substrate is between the photosensor and the second transparent substrate, and the light may be configured to provide illumination for the electronic device. The controller may be coupled to the photosensor and the light, and the controller may be configured to vary an intensity of the illumination from the light responsive to an intensity of light incident on the photosensor.

More particularly, the light may be a backlight configured to provide illumination through the first and second transparent substrates and the liquid crystal material of the liquid crystal display. In addition or in an alternative, the light may be configured to provide illumination for a keypad. For example, one or more backlights may be configured to provide illumination for a keypad. The photosensor may include a photoconductive material having an electrical resistance that varies with varying intensities of light thereon. For example, the photoconductive material may include a semiconductor material such as Cadmium Sulfide (CdS).

In addition, the liquid crystal display may include an array of pixels between the first and second transparent substrates, and each pixel of the array may include a respective transistor. Moreover, the first transparent substrate may include an active display area and an inactive display area outside the active display area, and the photosensor may be on a portion of the inactive display area of the first transparent substrate outside the active display area.

The controller may be further configured to process information to be provided on the liquid crystal display. In addition, a transceiver may be configured to transmit and receive wireless communications (such as radiotelephone communications) with the controller being further configured to process communications transmitted and received through the transceiver. The controller may also be configured to provide one or more of a calendar function, an appointment function, a calculator function, an address book function, a task function, an internet browsing function, an e-mail function, a camera function, a video recorder function, a video player function, an audio recorder function, an audio player function, and/or a radiotelephone function. The electronic device may also include a housing having a window therein with the window exposing portions of the first transparent substrate and the photosensor.

According to additional embodiments of the present invention, an electronic device may include a display, a photosensor, a light, and a controller. The display may include a transparent substrate having an active display area and an inactive display area surrounding the active display area. The photosensor may be on a portion of the inactive display area of the transparent substrate outside the active display area. More particularly, the photosensor may include a photoconductive material having an electrical resistance that varies with varying light intensities thereon, and a current path through the photosensor may be parallel with respect to the transparent substrate. The light may be configured to provide illumination for the electronic device. The controller may be coupled to the photosensor and the light, and the controller may be configured to vary an intensity of the illumination from the light responsive to variations in the electrical resistance of the photoconductive material.

More particularly, the light may be a backlight configured to provide illumination through the transparent substrate of the display. In addition or in an alternative, the light may be configured to provide illumination for a keypad. For example, one or more backlights may be configured to provide illumination for a keypad.

The display may be a liquid crystal display including a second transparent substrate and liquid crystal material between the first and second transparent substrates with the first transparent substrate between the photosensor and the second transparent substrate. The liquid crystal display may also include an array of pixels between the first and second transparent substrates, and each pixel may include a transistor. Moreover, the photoconductive material may include a semiconductor material, such as Cadmium Sulfide (CdS).

The controller may also be configured to process information to be provided on the display. In addition, a transceiver may be configured to transmit and receive wireless communications, and the controller may be further configured to process communications transmitted and received through the transceiver. The controller may also be configured to provide at least one of a calendar function, an appointment function, a calculator function, an address book function, a task function, an internet browsing function, an e-mail function, a camera function, a video recorder function, a video player function, an audio recorder function, an audio player function, and/or a radiotelephone function. The electronic device may also include a housing having a window therein with the window exposing the active area of the transparent substrate and the photosensor.

According to still additional embodiments of the present invention, a liquid crystal display for an electronic device may include first and second transparent substrates, a liquid crystal display, and a photosensor. The liquid crystal material may be provided between the first and second transparent substrates, and the photosensor may be provided on a portion of the first transparent substrate opposite the second transparent substrate.

The photosensor may include a photoconductive material having an electrical resistance that varies with varying light intensities thereon. For example, the photoconductive material may include a semiconductor material such as Cadmium Sulfide (CdS). In addition, an array of pixels may be provided between the first and second transparent substrates, and each pixel may include a transistor. The first transparent substrate may also include an active display area and an inactive display area outside the active display area, and the photosensor may be provided on a portion of the inactive display area of the first transparent substrate outside the active display area.

According to yet additional embodiments of the present invention, a display for an electronic device may include a transparent substrate and a photosensor. The transparent substrate may include an active area and an inactive area surrounding the active area. The photosensor may be provided on a portion of the inactive area of the transparent substrate outside the active area, and the photosensor may include a photoconductive material having an electrical resistance that varies with varying light intensities thereon. In addition, a current path through the photosensor may be parallel with respect to the transparent substrate.

The display may also include a second transparent substrate and liquid crystal material between the first and second substrates, and the first transparent substrate may be between the photosensor and the second transparent substrate. In addition, an array of pixels may be provided between the first and second transparent substrates, and each pixel may include a respective transistor. Moreover, the photoconductive material may include a semiconductor material such as Cadmium Sulfide (CdS).

DETAILED DESCRIPTION

Figure 1A:
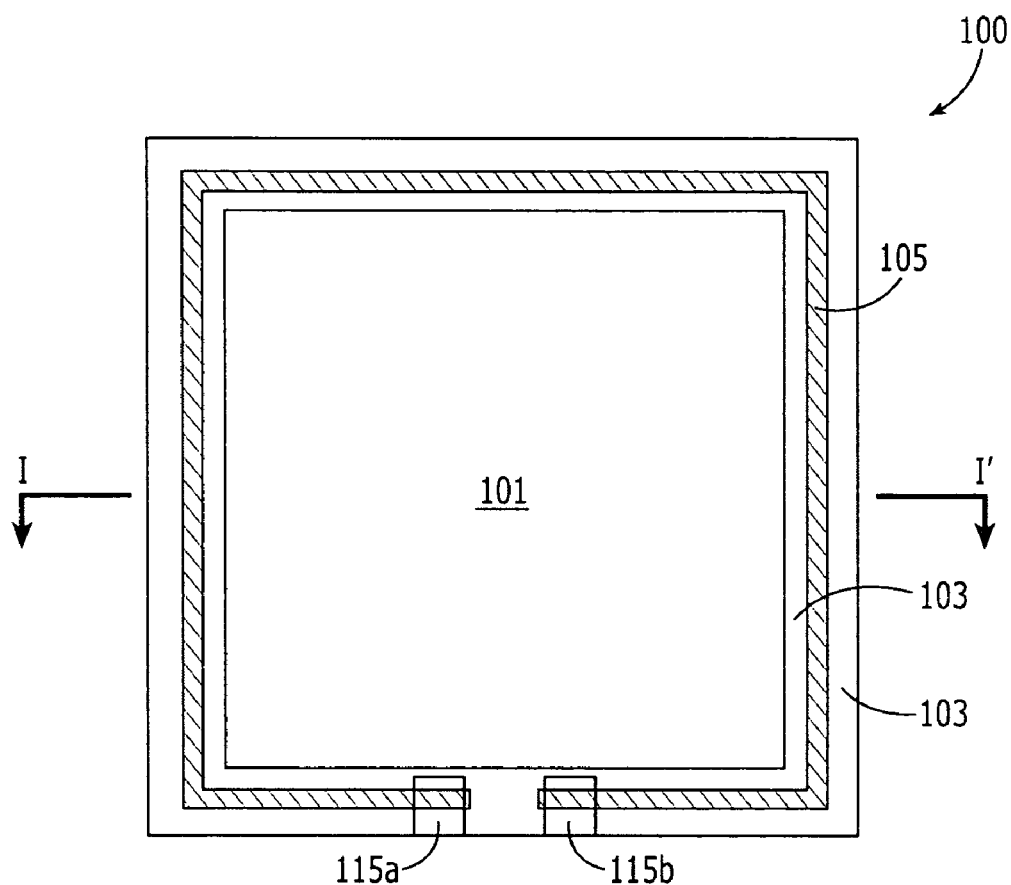
FIG. 1A is a plan view of a liquid crystal display including a photosensor according to embodiments of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will also be understood that although the terms first, second, etc. are used herein to describe various elements, these elements should not be limited by these terms. These terms are only used to distinguish one element or embodiment from another element or embodiment. Thus, a first element or embodiment could be termed a second element or embodiment, and similarly, a second element or embodiment may be termed a first element or embodiment without departing from the teachings of the present invention.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Embodiments of the invention are described herein with reference to cross-sectional illustrations that are schematic illustrations of idealized embodiments of the invention. The thickness of layers and regions in the drawings may be exaggerated for clarity. Additionally, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the exact shape of a region of a device and are not intended to limit the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
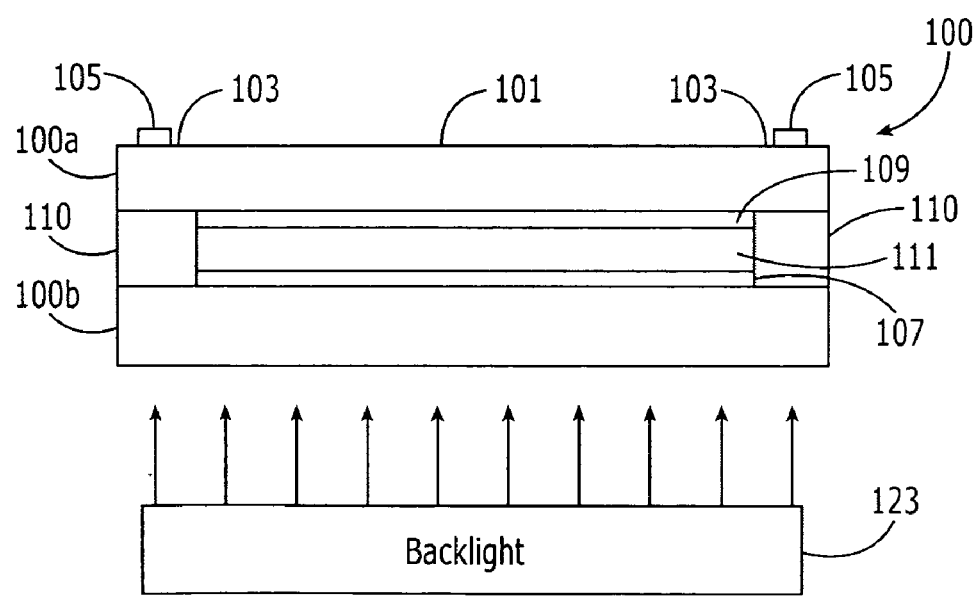
FIG. 1B is a cross-sectional view taken along section line I-I' of liquid crystal display of FIG. 1.

As shown in FIGS. 1A-B, a liquid crystal display 100 according to embodiments of the present invention may include first and second transparent substrates 100a-b (such as glass substrates); a color filter 109 on the first transparent substrate 100a; and a transistor array 107 (such as a thin film transistor array) on the second transparent substrate 100b. In addition, a liquid crystal material 111 is provided between the first and second transparent substrates 100a-b, and a photosensor 105 is provided on the first transparent substrate 100a opposite the second transparent substrate 100b and the liquid crystal material 111. Moreover, a bonding material 110 may join the first and second transparent substrates 100a-b.

The first transparent substrate 100a may thus include an active display area 101 and an inactive display area 103 outside the active display area 101. Light transmitted through the second transparent substrate 100b, the transistor array 107, the liquid crystal material 111, the color filter 109, and the active display area 101 of the first transparent substrate 100a may be used to provide a visual output for an electronic device including the liquid crystal display 100. More particularly, each transistor of the transistor array 107 may be individually controlled to control individual pixels of the display. The inactive display area 103 may be used in part to mount and/or support the liquid crystal display 100 in an electronic device. The inactive display area 103, however, does not contribute to a visual output generated by the liquid crystal display 100.

The photosensor 105 may be a patterned layer (or film) of a material (such as a semiconductor material) having an electrical resistance that varies with varying intensities of light thereon. For example, the photosensor 105 may be a patterned layer of cadmium sulfide (CdS). Moreover, the photosensor 105 may be provided on the inactive display area 103 of the first transparent substrate 100a. Accordingly, the photosensor 105 does not interfere with a visual output provided at the active display area 101 of the liquid crystal display 100. In addition, input/output electrodes 115a-b may be provided on the first transparent substrate 100a to couple the photosensor 105 to a controller of an electronic device in which the liquid crystal display 100 is included. The electrodes 115a-b may be formed from a transparent conductive material such as indium tin oxide (ITO) so as not to interfere with transmission of ambient light through the electrodes to the photosensor 103. In an alternative, a non-transparent conductive material may be used for the electrodes 15a-b with the electrodes being provided between the photosensor 105 and the first transparent substrate 100a. A transparent protective layer may also be provided on the photosensor 105 and/or on the first transparent substrate 100a.

In operation, a backlight 123 may be provided to transmit illumination through the first and second transparent substrates 100a-b and the liquid crystal material 111, and a controller may be coupled to the photosensor 105 (through electrodes 115a-b) and to the backlight 123. As discussed above, an electrical resistance of the photosensor 105 may vary responsive to an intensity of light incident on the photosensor 105. Accordingly, an electrical signal applied to the photosensor 105 can be used to determine an intensity of ambient light (i.e. light from outside an electronic device including the liquid crystal display). While a single backlight is discussed by way of example with respect to FIGS. 1A and 1B, intensities of a plurality of backlights and/or frontlights may be varied responsive to an intensity of light incident on the photosensor.

An intensity of illumination provided by the backlight 123 can thus be varied responsive to the intensity of light incident on the photosensor 105. For example, the backlight 123 may provide a relatively high intensity of illumination when ambient light sensed using the photosensor 105 is relatively high. Accordingly, a clarity of the display can be increased when used in a bright environment. The backlight 123 may provide a relatively low intensity of illumination when ambient light sensed using the photosensor 105 is relatively low. Accordingly, unnecessary power consumption and/or a blinding effect can be reduced when used in a low light environment. In addition or in an alternative, illumination from a light or lights other than a display backlight may be varied responsive to the intensity of light incident on the photosensor 105. For example, an intensity of illumination from a light system (including one or more backlights) for a keypad may be varied responsive to the intensity of light incident on the photosensor 105, and/or an intensity of illumination from a frontlight may be varied responsive to the intensity of light incident on the photosensor 105. With backlighting for a keypad, for example, different backlights may be provided for different keys and/or groups of keys.

Moreover, the liquid crystal display 100 may be configured to shield the photosensor 105 from illumination generated by the backlight 123. Accordingly, a more accurate determination of the ambient light may be provided. For example, the bonding material 110 may be opaque. In an alternative, an opaque material may be provided between the photosensor 105 and the first transparent substrate 100a. In another alternative, an opaque material may be provided between the backlight 123 and the second transparent substrate 100b along a peripheral area of the second transparent substrate 100b.

While not shown in FIGS. 1A-B, the liquid crystal display may include a flexible connector providing electrical coupling of the electrodes 115a-b and/or the transistor array 107 with other components of an electrical device including the liquid crystal display 100. While a flexible connector is discussed by way of example, other electrical couplings may be provided.

In FIGS. 1A-B, the photosensor 105 is illustrated including linear segments along each of the edges of the liquid crystal display. The photosensor 105, however, may have different arrangements. For example, the photosensor 105 may include serpentine sections to increase an effective length thereof. In another alternative, segments may be provided along fewer than all sides of the liquid crystal display. In still another alternative, the photosensor may spiral around the liquid crystal display with more than one segment being provided along portions of at least one side of the liquid crystal display.

Figure 2:
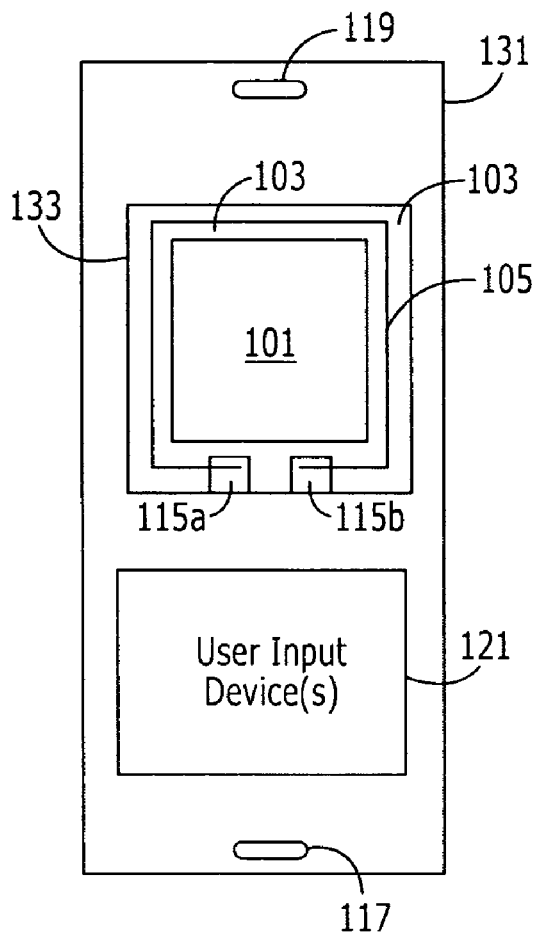
FIG. 2 is a plan view of an electronic device including a liquid crystal display according to embodiments of the present invention.

FIG. 2 illustrates an electronic device including a liquid crystal display according to embodiments of the present invention. As shown, the electronic device may include a housing 131 having a window 133 therein exposing portions of the liquid crystal display and the photosensor 105 thereon. The active display area 101 and portions of the inactive display area 103 are thus visible through the window 133 of housing 131. By providing the photosensor 103 on the liquid crystal display, a single window 133 can be provided for both viewing the active display area 101 of the liquid crystal display and exposing the photosensor 103, and a design of the housing 131 can thus be simplified. The window 133 may be an opening in the housing directly exposing portions of the liquid crystal display, or the window may include a transparent protective layer (such as a clear plastic layer) on portions of the liquid crystal display.

As shown in FIG. 2, the housing 131 may include openings 117 and/or 119 providing acoustic coupling for a microphone and/or a speaker within the housing 131. The electronic device may also include a user input device(s) 121 such as a keypad, a joystick, directional keys, and/or a dial. While not shown, the electronic device may include a wireless data port (such as an infrared data port), a wired data port (such as a universal serial bus port), and/or a wireless communications transceiver (such as a WiFi transceiver, a Bluetooth transceiver, and/or a radiotelephone transceiver). The electronic device, for example, may thus provide functionality of a radiotelephone, a personal digital assistant, a handheld/laptop/notebook computer, an audio payer/recorder, a camera, a video recorder/player, and/or a calculator. Moreover, the liquid crystal display may be a touch sensitive display configured to accept user input. Such a touch sensitive display may be provided in addition to or instead of the user input device(s) 117.

By way of example, the electronic device may be a radiotelephone including both a speaker and a microphone. In an alternative, the electronic device may be an audio player including only a speaker. In another alternative, the electronic device may be a personal digital assistant including neither a speaker or a microphone.

As discussed above, one or more backlights may be included within the housing 131, and an intensity of illumination generated by one or more of these backlights may be varied responsive to an intensity of light incident on the photosensor 105 through the window 133. For example, a display backlight may be configured to provide illumination through the first and second transparent substrates and the liquid crystal material in the active display area 101 of the liquid crystal display, and an intensity of the illumination through the display may be varied responsive to an intensity of light incident on the photosensor 105. In addition or in an alternative, a backlight may provide illumination for a keypad of the user input device(s) 121 and an intensity of the illumination for the keypad may be varied responsive to an intensity of light incident on the photosensor 105.

Figure 3:
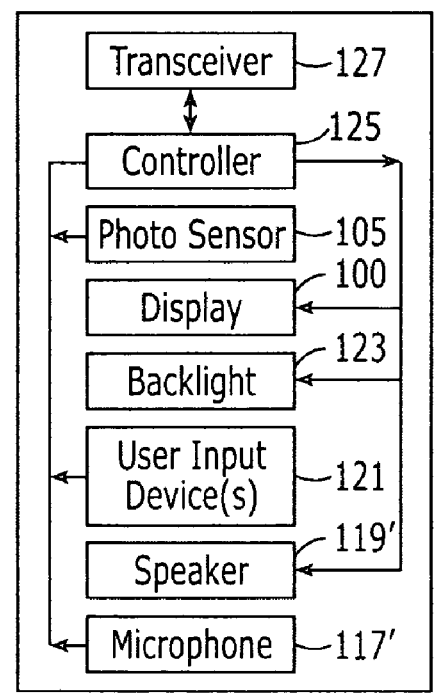
FIG. 3 is a block diagram of an electronic device including a liquid crystal display according to embodiments of the present invention.

A block diagram of a radiotelephone according to embodiments of the present invention is illustrated in FIG. 3. Portions of the user input device(s) 121 may be exposed through the housing 131 of the electronic device, and portions of the display 100 and the photosensor 105 may be visible through the window 133 in the housing 131. In contrast, the controller 125, the transceiver 127, the backlight 123, the speaker 119', and/or the microphone 117' may be provided (in whole or in part) within the housing 131.

In a radiotelephone, the transceiver 127 may be configured to transmit and receive wireless radiotelephone communications, and the controller 125 may be configured to process communications transmitted and/or received through the transceiver 127. The transceiver 127 may thus include a receiver, a transmitter, and/or an antenna. Audio input from the microphone 117' may thus be processed by the controller 125 and transmitted by the transceiver, and audio output may be provided from the speaker 119' responsive to communications received through the transceiver 127 and processed by the controller 125. The user input device(s) 121 may be used to accept information such as a telephone number being dialed, and the active display area 101 may provide visual information such as a telephone number being dialed or an address book entry.

The backlight 123 may provide illumination through the active area of the display 100 as discussed above, and an intensity of the illumination provided by the backlight 123 may vary responsive to an intensity of ambient light from outside the housing of the electronic device on the photosensor 105. The controller 100 may be coupled to the photosensor 105, and electrical signals through the photosensor 105 may be used by the controller 125 to determine an intensity of illumination on the photosensor 105. More particularly, an electrical resistance of the photosensor 105 may vary with variations in an intensity of light thereon. Accordingly, variations in resistance of the photosensor 105 may be determined using Ohm's law (i.e., $R=V/I$), for example, by providing a known current through the photosensor 105 and measuring the resulting voltage drop or by providing a known voltage across the photosensor 105 and measuring the resulting current through the photosensor 105. Moreover, different resistances of the photosensor 105 may correlate to different intensities of light thereon, and the controller 125 may use this correlation to determine an appropriate intensity of illumination to be provided by the backlight 123 through the active area of the display 100. The controller 125 can thus be configured to vary the intensity of the illumination of the backlight responsive to an intensity of light incident on the photosensor 105.

In an alternative, the backlight 123 may provide illumination for a user input device(s) 121 such as a keypad, and the controller 125 can be configured to vary the intensity of the illumination of the backlight through the keypad responsive to an intensity of light incident on the photosensor 100. In another alternative, the backlight 123 may provide illumination for the keypad and for the display, and the controller 125 may be configured to vary the intensity of the illumination of the backlight through the keypad and the display responsive to the intensity of light incident on the photosensor 105. In yet another alternative, separate backlights may provide illumination for the keypad and for the display, and the controller 125 may be configured to separately vary the intensity of illumination of the separate backlights through the keypad and the display responsive to the intensity of light incident on the photosensor 105.

While the controller 125 is shown as a single block, functionalities of the controller may be implemented in different components of the electronic device. For example, one processor may process communications transmitted and/or received through the transceiver 127, and another processor may control operations of the backlight 123.

By varying backlighting illumination intensities responsive to ambient lighting conditions, appropriate backlighting can be provided so that the display can be more easily viewed. For example, the backlighting intensity can be reduced when the ambient light is relatively low to save battery power and to reduce a blinding effect that may otherwise occur if a bright display is provided in low light conditions. The backlighting intensity for the display can be increased when the ambient light is relatively high so that the display is sufficiently visible in bright conditions. With a backlight for the keypad, the backlight for the keypad can be turned on when the ambient light is relatively low, and the backlight for the keypad can be turned off when the ambient light is relatively high. With separate backlights for the keypad and display, the illumination intensities for the keypad and display backlights can be varied separately. While embodiments of the present invention have been discussed with respect to backlights for keypads and/or displays, embodiments of the present invention may be implemented with other lights such as frontlights for keypads and/or displays.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An electronic device comprising:
   a display including a transparent substrate having a rectangular active display area and an inactive display area surrounding the rectangular active display area;
   a photosensor on a portion of the inactive display area of the transparent substrate outside the rectangular active display area wherein the photosensor comprises a photoconductive material having an electrical resistance that varies with varying light intensities thereon and wherein a current path through the photosensor is parallel with respect to a surface of the transparent substrate wherein the photosensor has a continuous length of the current path that is at least about half of a length of a side of the rectangular active display area of the transparent substrate;
   a light configured to provide illumination for the electronic device; and
   a controller coupled to the photosensor and the light, the controller being configured to vary an intensity of the illumination from the light responsive to variations in the electrical resistance of the photoconductive material.

2. An electronic device according to claim 1 wherein the light is configured to provide illumination through the transparent substrate of the display.

3. An electronic device according to claim 1 further comprising:
   a keypad coupled to the controller wherein the light is configured to provide illumination for the keypad.

4. An electronic device according to claim 1 wherein the display comprises a liquid crystal display further including a second transparent substrate and liquid crystal material between the first and second substrates wherein the photosensor is on a portion of the first transparent substrate opposite the second transparent substrate so that the first transparent substrate is between the photosensor and the second transparent substrate, wherein the photosensor is shielded from illumination provided by the light.

5. An electronic device according to claim 4 wherein the liquid crystal display further comprises an array of pixels between the first and second transparent substrates.

6. An electronic device according to claim 1 wherein the photoconductive material comprises a semiconductor material.

7. An electronic device according to claim 1 wherein the photoconductive material comprises Cadmium Sulfide (CdS).

8. An electronic device according to claim 1 wherein the controller is further configured to process information to be provided on the display.

9. An electronic device according to claim 1 further comprising:
   a transceiver configured to transmit and receive wireless communications;
   wherein the controller is further configured to process communications transmitted and received through the transceiver.

10. An electronic device according to claim 1 wherein the controller is further configured to provide at least one of a calendar function, an appointment function, a calculator function, an address book function, a task function, an internet browsing function, an e-mail function, a camera function, a video recorder function, a video player function, an audio recorder function, an audio player function, and/or a radiotelephone function.

11. An electronic device according to claim 1 further comprising:
    a housing having a window therein, the window exposing the rectangular active display area of the transparent substrate and the photosensor.

12. An electronic device according to claim 1 wherein the rectangular active display area is free of the photosensor and wherein a length of the current path through the photosensor is greater than a length of a side of the rectangular active display area of the transparent substrate.

13. An electronic device according to claim 12 wherein the photosensor extends continuously along portions of at least two sides of the rectangular active display area of the transparent substrate meeting at a corner of the rectangular active display area of the transparent substrate.

14. An electronic device according to claim 1 wherein the photosensor has a continuous length of the photoconductive material that is at least about half of a length of a side of the rectangular active display area of the transparent substrate.

15. A display for an electronic device, the display comprising:
    a transparent substrate comprising a rectangular active display area and an inactive area surrounding the rectangular active display area; and
    a photosensor on a portion of the inactive area of the transparent substrate outside the rectangular active display area wherein the photosensor comprises a photoconductive material having an electrical resistance that varies with varying light intensities thereon and wherein a current path through the photoconductive material of the photosensor is parallel with respect to a surface of the transparent substrate wherein the photosensor has a continuous length of the current path that is at least about half of a length of a side of the rectangular active display area an edge of the transparent substrate.

16. A display according to claim 15 further comprising:
    a second transparent substrate and liquid crystal material between the first and second substrates wherein the photosensor is on a portion of the first transparent substrate opposite the second transparent substrate so that the first transparent substrate is between the photosensor and the second transparent substrate wherein the photosensor is shielded from illumination transmitted through the first and second transparent substrates.

17. A display according to claim 16 further comprising:
    an array of pixels between the first and second transparent substrates.

18. A display according to claim 15 wherein the photoconductive material comprises a semiconductor material.

19. A display according to claim 15 wherein the photoconductive material comprises Cadmium Sulfide (CdS).

20. An electronic device according to claim 15 wherein the rectangular active display area is free of the photosensor and wherein a length of the current path through the photosensor is greater than a length of a side of the rectangular active display area of the transparent substrate.

21. An electronic device according to claim 20 wherein the photosensor extends continuously along portions of at least two sides of the rectangular active display area of the transparent substrate meeting at a corner of the rectangular active display area of the transparent substrate.

22. A display according to claim 15 wherein the photosensor has a continuous length of the photoconductive material that is at least about half of a length of a side of the rectangular active display area of the transparent substrate.

* * * * *